US011382259B2

(12) United States Patent
Hu et al.

(10) Patent No.: US 11,382,259 B2
(45) Date of Patent: Jul. 12, 2022

(54) PLUG SEEDLING AUTOMATIC TRANSPLANTING MACHINE AND ITS CONTROL METHOD (71) Applicant: JIANGSU UNIVERSITY, Jiangsu (CN)

(72) Inventors: Jianping Hu, Jiangsu (CN); Jie Pan, Jiangsu (CN); Weizheng Fei, Jiangsu (CN); Zhaoxia Luo, Jiangsu (CN); Lvhua Han, Jiangsu (CN); Deyong Yang, Jiangsu (CN); Jing Li, Jiangsu (CN)

(73) Assignee: JIANGSU UNIVERSITY, Jiangsu (CN)

( * ) Notice: Subject to any disclaimer, the term of this patent is extended or adjusted under 35 U.S.C. 154(b) by 277 days.

(21) Appl. No.: 16/477,810

(22) PCT Filed: Jul. 24, 2018

(86) PCT No.: PCT/CN2018/096739
§ 371 (c)(1),
(2) Date: Jul. 12, 2019

(87) PCT Pub. No.: WO2019/148782
PCT Pub. Date: Aug. 8, 2019

(65) Prior Publication Data
US 2021/0329831 A1 Oct. 28, 2021

(30) Foreign Application Priority Data

Feb. 2, 2018 (CN) .......................... 201810105734.4
Jul. 11, 2018 (CN) .......................... 201810757620.8

(51) Int. Cl.
A01C 11/02 (2006.01)
(52) U.S. Cl.
CPC ................................. A01C 11/025 (2013.01)

(58) Field of Classification Search
CPC ....... A01C 11/025; A01C 11/02; A01C 11/00; A01C 11/006; A01C 11/04
See application file for complete search history.

(56) References Cited

U.S. PATENT DOCUMENTS 5,215,550 A * 6/1993 Tesch, Jr ............... A01C 11/025
111/101
5,765,491 A * 6/1998 Brower ................ A01C 11/025
111/105
(Continued)

FOREIGN PATENT DOCUMENTS

CN 102960105 A 3/2013
CN 103636330 A 3/2014
(Continued)

Primary Examiner — Jamie L McGowan
(74) Attorney, Agent, or Firm — Saliwanchik, Lloyd & Eisenschenk (57) ABSTRACT A plug-tray seedling automatic transplanting machine and control method thereof, wherein, said machine comprises a chassis bracket, a planting mechanism, seedling separating mechanisms, seedling guiding devices, a power mechanism, a box shifting mechanism, a seedling picking mechanism. The box shifting mechanism is installed on the chassis bracket, the seedling picking mechanism is installed on the box shifting mechanism, and two sets of seedling separating mechanism are symmetrically arranged on both sides of the box shifting mechanism by the chassis bracket, the seedling guiding device is provided above each set of seedling separating mechanism, and the planting mechanism is provided under each set of seedling separating mechanism. With the synergistic effect of various mechanisms and control system, it is possible to pick seedlings in whole row without interval in various sizes of plug-trays, and drop seedlings at the same time, which increase the efficiency and success rate of picking seedlings and dropping seedlings. The plug-tray only needs to move longitudinally, thereby (Continued)

improving the efficiency of the plug-tray transport. The seedling claw can comb the pot seedlings before being inserted into the pot, which improves the quality of seedling picking. The seedling guiding device receives the seedlings statically and shortens the free-falling movement distance, which makes seedling dropping more accurate.

8 Claims, 7 Drawing Sheets

(56) References Cited

U.S. PATENT DOCUMENTS

| | | | | |
|---|---|---|---|---|
| 6,073,564 | A * | 6/2000 | Keskilohko | A01C 11/025 111/105 |
| 6,634,306 | B1 * | 10/2003 | Faulring | A01C 11/025 111/105 |
| 7,051,475 | B1 * | 5/2006 | Sena | A01C 11/025 111/105 |
| 2010/0170426 | A1 * | 7/2010 | Faulring | A01C 11/025 111/105 |
| 2012/0174839 | A1 * | 7/2012 | Faulring | A01G 9/0299 111/100 |
| 2017/0265378 | A1 * | 9/2017 | Aikala | A01C 11/02 |
| 2019/0045706 | A1 * | 2/2019 | Kafri | A01C 11/025 |
| 2020/0375089 | A1 * | 12/2020 | Crouse | A01C 11/025 |

FOREIGN PATENT DOCUMENTS

| | | |
|---|---|---|
| CN | 105103741 A | 12/2015 |
| CN | 106358537 A | 2/2017 |
| JP | 2008054574 A | 3/2008 |

\* cited by examiner

PLUG SEEDLING AUTOMATIC TRANSPLANTING MACHINE AND ITS CONTROL METHOD

CROSS REFERENCE TO RELATED APPLICATIONS

This application is a National Stage Application of International Application Number PCT/CN2018/096739, filed Jul. 24, 2018; which claims priority to Chinese Application Nos. 201810105734.4, filed Feb. 2, 2018, and 201810757620.8, filed Jul. 11, 2018.

TECHNICAL FIELD

The invention relates to the field of agricultural machinery, in particular to a plug-tray seedling automatic transplanting machine and control method thereof.

BACKGROUND ART

Vegetables are an indispensable kind of food in life. China's vegetable planting area has reached 300 million mu, the annual output of vegetable exceeds 700 million tons, and continues to grow. China is the largest vegetable producing and consuming country in the world. At present, the cultivation of agricultural vegetables in China mostly adopts the method of first breeding seedlings in plug-tray and then transplanting for cultivation, which can make vegetables avoid natural disasters such as drought and cold damage during seedling breeding period. It also can make full use of light and heat resources, and has the effects of climate compensation and early maturing and yield increase of crops. This method has enormous economic and social benefits. Therefore, the development of a fully automatic vegetable transplanting machine which is suitable for China's national conditions has become a prerequisite for large-scale planting of vegetables.

At present, the transplanting machines on the market are divided into two types: semi-automatic and fully automatic. The semi-automatic transplanting machine needs to manually pick seedlings from the plug-tray and drop seedlings. This transplanting machine has high labor intensity and low efficiency. The fully automatic transplanting machine integrates advanced integrated technology of machine, electricity, liquid and gas, which can realize automatic vegetable transplanting in the whole process of picking seedling, dropping seedling, planting and covering soil, with low labor intensity and high efficiency. In the existing technology, Chinese patent publication No. 106358537A discloses a plug-tray seedling automatic transplanting machine and control system thereof. The transplanting machine and its control system adopt a swinging seedling picking mechanism, and seedlings are picked at intervals and six seedlings are picked at one time, thereby realizing uninterrupted plug-tray supply and seedling picking. However, it is necessary to finish picking a row of seedlings in twice, the plug-tray needs to be moved vertically and laterally, as a result, the efficiency is low. After the plug-tray is in place, the seedling claws are inserted from the above of the seedling pot, and the leaves and stems of the seedlings are greatly damaged. As the seedlings are dropped in sequence, and the seedling separating mechanism receives the seedlings during moving. When the speed is relative faster, it is easy to produce problems such as hanging seedlings and poor posture of seedling dropping. There is only one set of seedling picking mechanism and seedling separating mechanism, which cannot meet the requirements of different crops with different row spacing during transplanting.

Content of Invention

In view of deficiencies of the existing technology, the invention provides a plug-tray seedling automatic transplanting machine and control method thereof, which can realize picking an entire row of seedlings without interval and dropping seedlings at the same time, and the problems brought by picking seedlings at interval and dropping seedlings in sequence that it is difficult to control the time for dropping seedlings and the success rate is low are overcome. The plug-tray only needs to be vertically transported and moved, thereby improving the efficiency of plug-tray transport, picking seedling and dropping seedling. By changing the number of seedling claws, it can be adapted to 72 holes, 128 holes and other kinds of plug-trays. The seedling claws reach the seedling picking point at first, and then the whole row of seedlings is transferred via translation to the below of the seedling claws to pick the seedlings, so that the seedling claws can comb the seedlings in the pot before being inserted into the pot, and the adjacent leaves of the pot seedlings which are staggered together can be separated. It overcomes the phenomenon of clipping seedlings and damaging seedlings when the existing seedling claws are directly inserted into the pot from above of the pot seedlings to pick seedlings, which reduces damage to pot seedlings and improves seedling picking quality. The seedling guiding device receives the seedlings statically and shortens the free-falling movement distance, so that the dropping of seedlings is more accurate. There are two sets of seedling picking, seedling dropping, seedling separating and planting devices, which can meet requirements of different crops with different row spacing when transplanting.

The invention achieves the above technical objects by the following technical means.

A plug-tray seedling automatic transplanting machine, including a chassis bracket, a planting mechanism, seedling guiding devices, seedling separating mechanisms, and a power mechanism, the power mechanism is installed on the chassis bracket for powering the transplanting machine; characterized in that, the machine further includes a box shifting mechanism, a seedling picking mechanism and a control system, the box shifting mechanism is installed on the chassis bracket, the seedling picking mechanism is installed on the box shifting mechanism, and two sets of seedling separating mechanism are symmetrically arranged on both sides of the box shifting mechanism through the chassis bracket, the seedling guiding devices are provided above each set of the seedling separating mechanism, and the planting mechanism is provided under each set of the seedling separating mechanism; the control system controls the power mechanism, the planting mechanisms, the seedling separating mechanisms, the box shifting mechanism, and the seedling picking mechanism;

the box shifting mechanism includes a plug-tray, a position proximity switch, a plug-tray recovery device, a box shifting bracket, and a conveying device, the conveying device is installed on the chassis bracket by the box shifting bracket; the plug-tray is placed on the conveying device, the conveying device is provided with the plug-tray recovery device at the end of the moving direction; the position proximity switch is installed on the box shifting bracket for judging whether the plug-tray has reached the pre-picking point, and transmitting the signal to the control system, the control system controls operation of the conveying device;

the seedling picking mechanism includes a first linear guiderail pair, a seedling picking bracket, movable seedling claw devices, the second actuator limit blocks, a first actuator, a bottom plate, a second linear guiderail pair, a second actuator, a first travel switch group and a second travel switch group; the seedling picking bracket is fixed on the box shifting bracket, the first actuator is installed on the seedling picking bracket, the pull rod of the first actuator is connected to the bottom plate, and the bottom plate is connected to the seedling picking bracket through the first linear guiderail pair, the bottom plate is moved up and down by the first actuator; the bottom plate is connected to two movable seedling claw devices through the second linear guiderail pair, the second linear guiderail pair is arranged in a horizontal direction; each movable seedling claw device is connected to the second actuator, several second actuator limit blocks are provided on the bottom plate located near the seedling picking point and the seedling dropping point, the movable seedling claw device moves between the seedling picking point and the seedling dropping point by means of the second actuator and the second actuator limit block; the first travel switch group is installed near the first linear guiderail pair for judging whether the bottom plate reaches a predetermined position, and the second travel switch group is installed near the second linear guiderail pair for judging whether the movable seedling claw device reaches the predetermined position; the signals are transmitted to the control system respectively by the first travel switch group and the second travel switch group, the control system controls the movement of the first actuator, the second actuator, and the movable seedling claw device.

Furthermore, the movable seedling claw device includes springs, seedling claw spacers, seedling claws, and screw rods, several seedling claws are installed on the bottom plate through the second linear guiderail pair; stop blocks are arranged on both sides of the screw rods, and two adjacent seedling claws are installed on the screw rod between the two stop blocks, the screw rod is covered with a spring, the spring is located between the two adjacent seedling claws; any one of the seedling claws at the two ends of the linearly-arranged seedling claws are connected to the second actuator; the seedling claws are provided with seedling claw spacers, when the second actuator moves, the seedling claw spacers make the distance between the adjacent seedling claws the same as the distance between the holes of the plug-tray, and the center of the seedling claw is coaxial with the center of the hole of the plug-tray.

Furthermore, seedling separating cups are arranged in the seedling separating mechanisms in a circular shape, and a travel switch is installed on the seedling separating mechanism for detecting the number of turned separating cups.

Furthermore, the seedling guiding device includes inclined seedling guiding barrels, a seedling guiding device bracket, inclined seedling guiding barrel clasps, vertical seedling guiding barrel clasps, and vertical seedling guiding barrels; the seedling guiding device bracket is installed on the seedling separating mechanism, the vertical seedling guiding barrel clasps and the inclined seedling guiding barrel clasps are respectively installed on the seedling guiding device bracket, the vertical seedling guiding barrels are installed in the vertical seedling guiding barrel clasps, the inclined seedling guiding barrels are installed in the inclined seedling guiding barrel clasps, and the seedling guiding outlets of the vertical seedling guiding barrels and the inclined seedling guiding barrels are in one-to-one correspondence with the seedling separating cups in the seedling separating mechanism.

Furthermore, the first actuator and the second actuator are both double-acting cylinders; it further includes a gas source FRL and a pressure sensor, the gas source FRL is installed on the seedling picking bracket, one end of the gas source FRL is connected to gas source, and the other end is connected in parallel with the first actuator and the second actuator; solenoid valves are disposed on each of the first actuator and the second actuator.

Furthermore, it also includes a gas storage tank, a clutch device, and an air compressor pump head; the air compressor is coupled to the power mechanism for generating compressed gas; one end of the gas storage tank is connected to the air compressor pump head, and the other end is connected to the gas source FRL;

the clutch device includes a pump head mount, a clutch handle, a positioning ball, a positioning spring, a connecting piece and guiding strips; two guiding strips are installed in parallel on the chassis bracket, the air compressor pump head is installed on the pump head mount, the pump head mount is located between the two guiding strips, and the pump head mount can be moved along the guiding strips; the clutch handle is rotatably installed on the chassis bracket, the bottom of the clutch handle is provided with a first blind hole, the positioning ball and the positioning spring are placed in the first blind hole, and the positioning spring is located above the positioning ball, one end of the connecting piece is rotatably installed on the pump head mount, and the other end is rotatably installed on the clutch handle, the chassis bracket is provided with a second blind hole and a third blind hole, the second blind hole, the third blind hole and the first blind hole are at the same distance from the center of the clutch handle.

A control method of plug-tray seedling automatic transplanting machine, including the following steps:

S1: the plug-tray is placed on the conveying device of the box shifting mechanism, at this time the seedling claws of the two sets of seedling claw devices are located above the seedling guiding device and are concentric with the seedling guiding barrels; the control system starts the conveying device to transport the plug-tray to the pre-picking point and stops the movement of the conveying device according to the signal output from the position proximity switch;

S2: the second actuator is activated, and the control system controls the movement of the movable seedling claw device to the picking point according to the signal output by the second travel switch group; each of the seedling claws is located above the first row of holes of the plug-tray, and the center of the hole is concentric with each of the seedling claws;

S3: the control system activates the conveying device to transport the plug-tray to the picking point according to the signal output by the second travel switch group; the control system controls the first actuator to insert the movable seedling claw device into the pot seedling, and at the same time, according to the signal generated by the first travel switch group, the seedling claw is controlled to clamp the pot seedling;

S4: the control system controls the first actuator to drive the movable seedling claw device to pull out the pot seedling; the control system controls the second actuator to drive the movable seedling claw device to move to the dropping point;

S5: assuming the plug-tray has N holes in each row, and there are M rows in total, the control system controls the seedling separating mechanism to rotate, when the seedling separating cups trigger the travel switch for N/2 times, according to the signals generated by the second travel switch group and the travel switch, the control system controls the seedling claws to open and drop the pot seedlings into the seedling guiding device, the pot seedlings enter the seedling separating mechanism along the vertical seedling guiding barrels and the inclined seedling guiding barrels, the seedling separating mechanism rotates the pot seedlings and transports them to the seedling dropping point and then the seedlings drop into the planting mechanism, a seedling picking and dropping cycle ends;

S6: the control system controls the second actuator to drive the movable seedling claw device to move to the picking point; the control system controls the conveying device to advance the plug-tray by the distance of one hole for the next picking and dropping cycle, after repeating the above process for M times, the control system controls the conveying device so that the plug-tray moves forward and then drops to the plug-tray recovery device.

Furthermore, step S0 is provided before the step S1, and the step sS0 is: the clutch handle is rotated, so that the positioning ball enters the third blind hole; at this time, the air compressor pump head is started and starts to deliver gas to the gas storage tank by the power mechanism; the control system detects the pressure of the gas storage tank to determine whether the air pressure reaches the desired working pressure, when the air pressure reaches the working air pressure required by the transplanting machine, the control system reaches the working condition.

The Beneficial Effects of the Invention

1. The plug-tray seedling automatic transplanting machine according to the present invention first transports the plug-tray to the seedling pre-picking point by the box shifting mechanism, and waits for the seedling claws to reach the seedling picking point, and then move the whole row of seedlings to the below of seedling claws for seedling picking. According to the present invention, the needles of the seedling claws pass through the middle of the two seedlings, separate the adjacent pot seedling leaves that are staggered together, and play a combing effect on the pot seedlings before being inserted into the pot. It overcomes the phenomenons of clipping and hurting seedlings when the existing seedling claws are inserted directly into the pot from the top of the seedlings to pick the seedlings. It reduces the damage to the seedlings and improves the quality of seedling picking.

2. The plug-tray seedling automatic transplanting machine according to the present invention can realize picking the entire row of seedlings without interval and dropping seedlings at the same time through seedling picking mechanism. It overcome the problem that it is difficult to control the time of dropping seedlings and low success rate of seedling dropping brought by picking seedlings at intervals and dropping seedlings in sequence. The plug-tray only needs to be vertically transported, which improves the efficiency of plug-tray transport, picking seedling and dropping seedling.

3. The plug-tray seedling automatic transplanting machine according to the present invention is adapted to 72 holes, 128 holes and other kinds of plug-trays through changing the number of seedling claws, thickness of seedling claw spacers.

4. The plug-tray seedling automatic transplanting machine according to the present invention can shorten the free-falling movement distance, and make the dropping of seedlings more accurate as the seedling guiding device receives the seedlings statically.

5. The plug-tray seedling automatic transplanting machine according to the present invention can change the position of the seedling dropping point through changing the position of second actuators limit block. With two independent seedling separating mechanism and seedling planting mechanism, it can adapt to the row spacing requirements of different planting.

6. The control method of plug-tray seedling automatic transplanting machine according to the present invention can adapt to different planting speeds, because the rotation speed change of the seedling separating mechanism can be fedback to the seedling picking mechanism to change time point of seedling dropping.

DESCRIPTION OF THE FIGURES

FIG. 3b is the back view of FIG. 3a.

FIG. 7b is a left view of FIG. 7a.

Wherein:

1. chassis bracket, 2. planting mechanism, 3. seedling separating mechanisms, 3-1. seedling separating cup, 3-2. travel switch, 4. seedling guiding device, 4-1. inclined seedling guiding barrel, 4-2. seedling guiding device bracket, 4-3. inclined seedling guiding barrel clasp, 4-4. vertical seedling guiding barrel clasp, 4-5. vertical seedling guiding barrel, 5. power mechanism, 5-1. gas storage tank, 5-2. clutch device, 5-3. air compressor pump head, 5-2-1. pump head mount, 5-2-2. clutch handle, 5-2-3. positioning ball, 5-2-4. positioning spring, 5-2-5. connecting piece, 5-2-6. guiding strip, 6. box shifting mechanism, 6-1. plug-tray, 6-2. position proximity switch, 6-3. plug-tray recovery device, 6-3-1. transition board of recovery box, 6-3-2. plug-tray recovery box, 6-4. box shifting bracket, 6-5. conveying device, 6-5-1. stepper motor, 6-5-2. motor mounting shaft, 6-5-3. coupling, 6-5-4. driving shaft, 6-5-5. driving chain wheel, 6-5-6. plug-tray conveying plate, 6-5-7. plug-tray driving strip, 6-5-8. driven chain wheel, 6-5-9. bearing, 6-5-10. driven shaft, 6-5-11. chain, 7. seedling picking mechanism, 7-1. first linear guiderail pair, 7-2. seedling picking bracket, 7-3. movable seedling claw device, 7-4. second actuator limit block, 7-5. first actuator, 7-6. bottom plate, 7-7. second linear guiderail pair, 7-8. gas source FRL, 7-9. pressure sensor, 7-10. second actuator, 7-11. first travel switch group, 7-12. second travel switch group, 7-13. compression rod, 7-14. compression rod mounting block.

EMBODIMENTS

The invention will be further described below in conjunction with the figures and specific examples, but the protection scope of the invention is not limited thereto.

Figure 1:
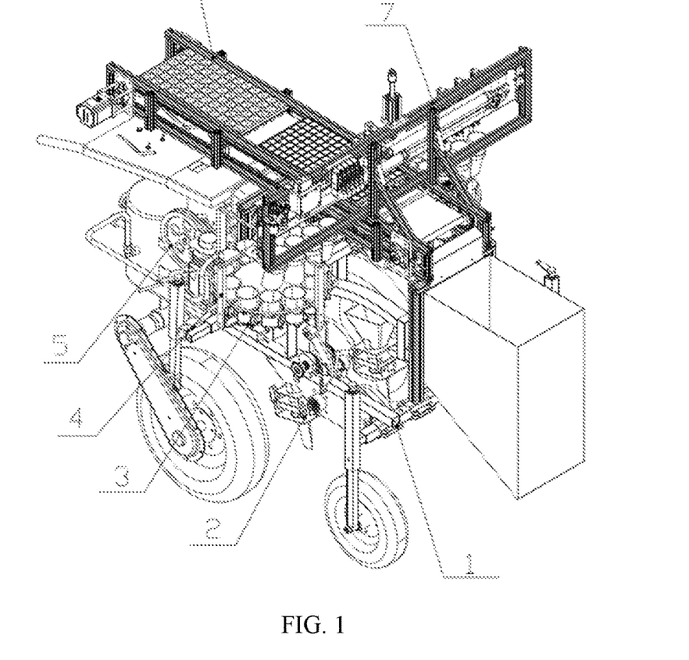
FIG. 1 is the overall structure diagram of plug-tray seedling automatic transplanting machine according to the present invention.

As shown in FIG. 1, a plug-tray seedling automatic transplanting machine of the present invention, includes a chassis bracket 1, a planting mechanism 2, seedling guiding devices 4, seedling separating mechanisms 3, and a power mechanism 5, the power mechanism 5 is installed on the chassis bracket 1 for powering the transplanting machine; characterized in that, the machine further includes a box shifting mechanism 6, a seedling picking mechanism 7 and a control system, the box shifting mechanism 6 is installed on the chassis bracket 1, the seedling picking mechanism 7 is installed on the box shifting mechanism 6, and two sets of seedling separating mechanism 3 are symmetrically arranged on both sides of the box shifting mechanism 6 through the chassis bracket 1, the seedling guiding devices 4 are provided above each set of the seedling separating mechanism 3, and the planting mechanism 2 is provided under each set of the seedling separating mechanism 3; the control system controls the power mechanism 5, the planting mechanisms 2, the seedling separating mechanisms 3, the box shifting mechanism 6, and the seedling picking mechanism 7.

Figure 2:
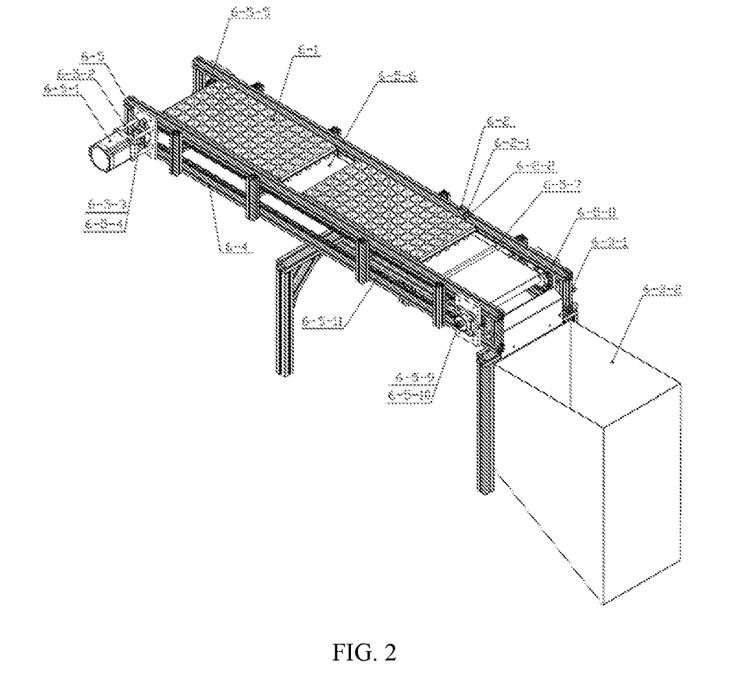
FIG. 2 is the structure diagram of the box shifting mechanism of plug-tray seedling automatic transplanting machine according to the present invention.

As shown in FIG. 2, the box shifting mechanism 6 includes a plug-tray 6-1, a position proximity switch 6-2, a plug-tray recovery device 6-3, a box shifting bracket 6-4, and a conveying device 6-5. The conveying device 6-5 includes a stepper motor 6-5-1, a motor mounting shaft 6-5-2, a coupling 6-5-3, a driving shaft 6-5-4, a driving chain wheel 6-5-5, a plug-tray conveying plate 6-5-6, a plug-tray driving strip 6-5-7, a driven chain wheel 6-5-8, a bearing 6-5-9, a driven shaft 6-5-10, a chain 6-5-11. The plug-tray conveying plate 6-5-6 is installed on a box shifting bracket 6-7. The driving shaft 6-5-4 and the driven shaft 6-5-10 are installed in parallel on the side of the box shifting bracket 6-7 by bearings 6-5-9. The driving chain wheel 6-5-5 is installed on the driving shaft 6-5-4, and the driven chain wheel 6-5-8 is installed on the driven shaft 6-5-10. The driving chain wheel and the driven chain wheel are connected by two identical chains 6-5-11, and the plug-tray driving strip 6-5-7 is installed on the corresponding links of the two chains 6-5-11. The stepping motor 6-5-1 is installed on the box shifting bracket 6-7 by the motor mounting shaft 6-5-2, and connected to the driving shaft 6-5-4 through the coupling 6-5-3. The plug-tray 6-1 is placed on the conveying device 6-5, and the conveying device 6-5 is provided with the plug-tray recovery device 6-3 on its end in the moving direction. The plug-tray recovery device 6-3 includes a transition board of recovery box 6-3-1 and a plug-tray recovery box 6-3-2. The plug-tray recovery box 6-3-2 is located below the transition board of recovery box 6-3-1. The transition board of recovery box 6-3-1 is divided into an upper plane, a transition oblique plane and a vertical side plane, wherein the upper plane should be no higher than the plug-tray conveying plate 6-5-6. The position proximity switch 6-2 is installed on the box shifting bracket 6-4 for judging whether the plug-tray 6-1 has reached the pre-picking point and transmitting the signal to the control system. The position proximity switch 6-2 includes a micro switch 6-2-1 and an induction iron wire 6-2-2. The induction iron wire 6-2-2 is fixed on the knob of the micro switch 6-2-1, the position of the micro switch 6-2-1 and the length of the induction iron wire 6-2-2 should be selected in such a way that when the plug-tray 6-1 is transported to the pre-picking point, the induction iron wire 6-2-2 is pushed open by the plug-tray 6-1 and triggers the micro switch 6-2-1. The control system controls the conveying distance of the plug-tray 6-1 by the conveying device 6-5 to according to the number of pulses transmitted to the stepping motor 6-5-1. When the plug-tray 6-1 triggers the position proximity switch 6-2, the number of pulses sent by the control system for the first time makes the plug-tray 6-1 accurately move to the seedling picking point, and then the number of pulses sent each time should make the tray 6-1 move the distance of a hole.

Figure 3A:
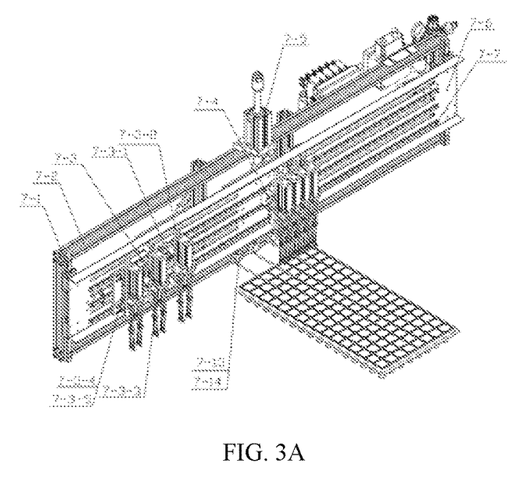
FIG. 3a is the structure diagram of seedling picking mechanism according to the present invention.
Figure 3B:
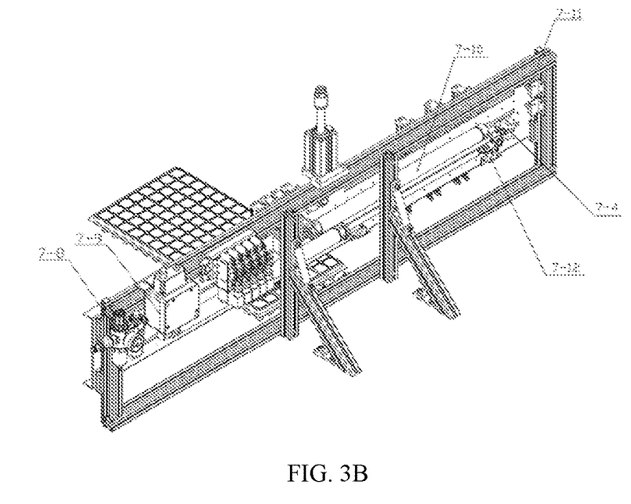

As shown in the FIG. 3, the seedling picking mechanism 7 includes a first linear guiderail pair 7-1, a seedling picking bracket 7-2, movable seedling claw devices 7-3, the second actuator limit blocks 7-4, a first actuator 7-5, a bottom plate 7-6, a second linear guiderail pair 7-7, a gas source FRL 7-8, a pressure sensor 7-9, a second actuator 7-10, a first travel switch group 7-11 and a second travel switch group 7-12; the seedling picking bracket 7-2 is fixed on the box shifting bracket 6-7, the first actuator 7-5 is installed on the seedling picking bracket 7-2, the pull rod of the first actuator 7-5 is connected to the bottom plate 7-6, and the bottom plate 7-6 is connected to the seedling picking bracket 7-2 through the first linear guiderail pair 7-1, the bottom plate 7-6 is moved up and down by the first actuator 7-5; the bottom plate 7-6 is connected to two movable seedling claw devices 7-3 through the second linear guiderail pair 7-7, the second linear guiderail pair 7-7 is arranged in a horizontal direction. The gas source FRL 7-8 is installed on the seedling picking bracket 7-2, one end of the gas source FRL 7-8 is connected to the gas source, and the other end is connected in parallel with the first actuator 7-5 and the second actuator 7-10. The first actuator 7-5 and the second actuator 7-10 are double-acting cylinder and solenoid valves are provided on each of the first actuator 7-5 and the second actuators 7-10. The pressure sensor is mounted on the seedling picking bracket 7-2, and the pressure sensor is connected to the airway for determining whether the air pressure reaches the required working pressure and transmitting the signal to the control system. Each movable seedling claw device 7-3 is connected to the second actuator 7-10, several second actuator limit blocks 7-4 are provided on the bottom plate 7-6 located near the seedling picking point and the seedling dropping point. Several second actuator limit blocks 7-4 define a movement limit position of the second actuators 7-10. The movable seedling claw device 7-3 moves between the seedling picking point and the seedling dropping point by means of the second actuator 7-10 and the second actuator limit block 7-4. Several mounting holes are arranged in parallel on the back surface of the bottom plate 7-6 in the moving direction of the second actuator 7-10, so that the position of the second actuator limit block 7-4 is adjustable to adjust the maximum extension length of the double-acting cylinder. The compression rod 7-13 is mounted on the front of the seedling picking bracket 7-2 through a compression rod mounting block 7-14, the position of the compression rod mounting block 7-14 is adjustable in left and right, and one end of the compression rod 7-13 has an external thread, and the upper and lower positions of the compression rod 7-13 are adjusted by the number of tightening turns to adapt to the plug-trays of various heights and different specifications.

The first travel switch group 7-11 is installed near the first linear guiderail pair 7-1 for judging whether the bottom plate 7-6 reaches a predetermined position, and the second travel switch group 7-12 is installed near the second linear guiderail pair 7-7 for judging whether the movable seedling claw device reaches the predetermined position; the signals are transmitted to the control system respectively by the first travel switch group 7-11 and the second travel switch group 7-12, the control system controls the movement of the first actuator 7-5, the second actuator 7-10, and the movable seedling claw device 7-3. Generally, the number of travel switches in the first travel switch group 7-11 and the second travel switch group 7-12 can be determined according to actual conditions. In the example of the present invention, the first travel switch group 7-11 has three travel switches, which are arranged from top to bottom, when the first travel switch is triggered, the movable seedling claw device 7-3 is located at a certain distance above the plug-tray 6-1, and when the second travel switch is triggered, the movable seedling claw device 7-3 contacts the upper surface of the pot in the plug-tray 6-1, and when the third travel switch is triggered, the movable seedling claw device 7-3 contacts the bottom surface of the hole in the plug-tray 6-1. The second travel switch group 7-12 has four travel switches, which are respectively located near the two seedling picking points and the two seedling dropping points. When the travel switches at the seedling picking point are triggered, the movable seedling claw device 7-3 is located at the seedling picking point, when the travel switches at the seedling dropping point are triggered, the movable seedling claw device 7-3 is located at the seedling dropping point.

Figure 4A:
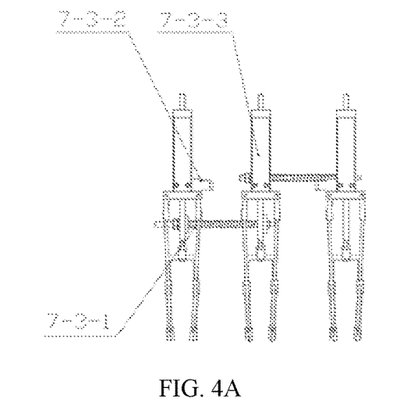
FIG. 4a is an installation diagram of the movable seedling picking mechanism according to the present invention.
Figure 4B:
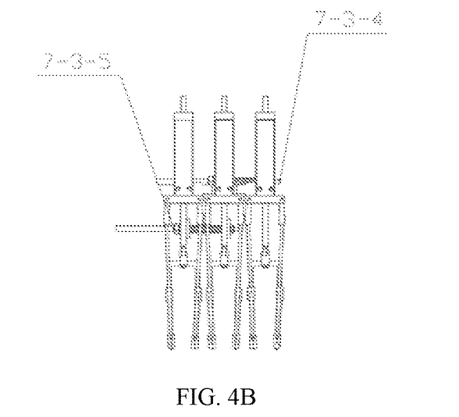
FIG. 4b is a diagram showing the working state of movable seedling picking mechanism according to the present invention.

As shown in FIG. 4, the movable seedling claw device 7-3 includes springs 7-3-1, seedling claw spacers 7-3-2, seedling claws 7-3-3, and screw rods 7-3-4, several seedling claws 7-3-3 are installed on the bottom plate 7-6 through the second linear guiderail pair 7-7; stop blocks 7-3-5 are arranged on both sides of the screw rods 7-3-4, and two adjacent seedling claws 7-3-3 are installed on the screw rod 7-3-4 between the two stop blocks 7-3-5, the screw rod 7-3-4 is covered with a spring 7-3-1, the spring 7-3-1 is located between the two adjacent seedling claws 7-3-3; any one of the seedling claws 7-3-3 at the two ends of the linearly-arranged seedling claws 7-3-3 are connected to the second actuator 7-10; the seedling claws 7-3-3 are provided with seedling claw spacers 7-3-2, when the second actuator 7-10 moves, the seedling claw spacers 7-3-2 make the distance between the adjacent seedling claws 7-3-3 the same as the distance between the holes of the plug-tray 6-1, and the center of the seedling claw is coaxial with the center of the hole of the plug-tray 6-1.

Figure 5:
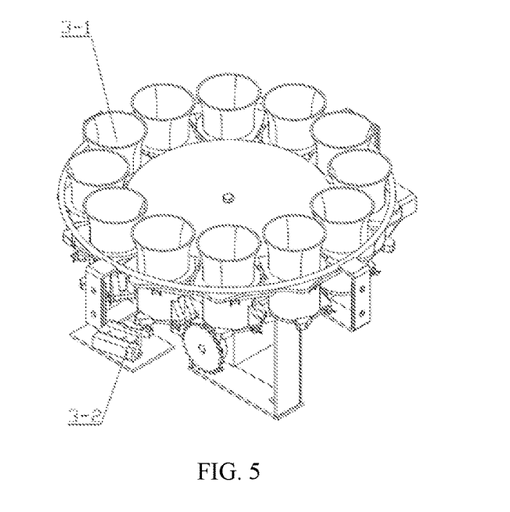
FIG. 5 is the structure diagram of seedling separating mechanism according to the present invention.

As shown in FIG. 5, seedling separating cups 3-1 are arranged in the seedling separating mechanisms 3 in a circular shape, and a travel switch 3-2 is installed on the seedling separating mechanism 3 for detecting the number of turned separating cups 3-1.

Figure 6:
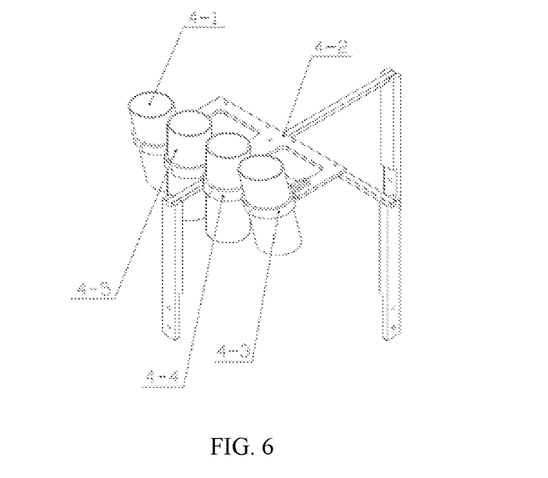
FIG. 6 is the structure diagram of seedling guiding device according to the present invention.
Figure 7A:
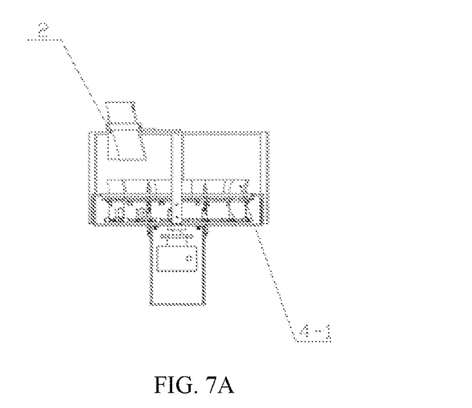
FIG. 7a is a diagram showing the positional relationship between the seedling guiding barrels and seedling guiding device according to the present invention.
Figure 7B:
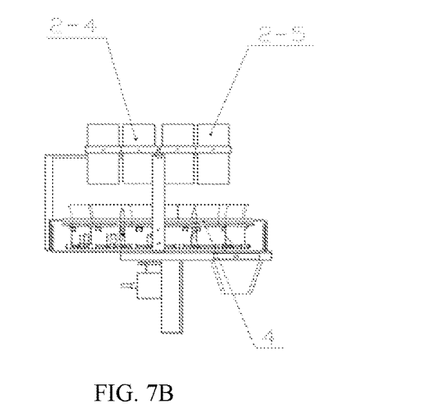

As shown in FIGS. 6 and 7, the seedling guiding device 4 includes inclined seedling guiding barrels 4-1, a seedling guiding device bracket 4-2, inclined seedling guiding barrel clasps 4-3, vertical seedling guiding barrel clasps 4-4, and vertical seedling guiding barrels 4-5; the seedling guiding device bracket 4-2 is installed on the seedling separating mechanism 3, the vertical seedling guiding barrel clasps 4-4 and the inclined seedling guiding barrel clasps 4-3 are respectively installed on the seedling guiding device bracket 4-2, the vertical seedling guiding barrels 4-5 are installed in the vertical seedling guiding barrel clasps 4-4, the inclined seedling guiding barrels 4-1 are installed in the inclined seedling guiding barrel clasps 4-3, and the seedling guiding outlets of the vertical seedling guiding barrels 4-5 and the inclined seedling guiding barrels 4-1 are in one-to-one correspondence with the seedling separating cups 3-1 in the seedling separating mechanism 3.

Figure 8:
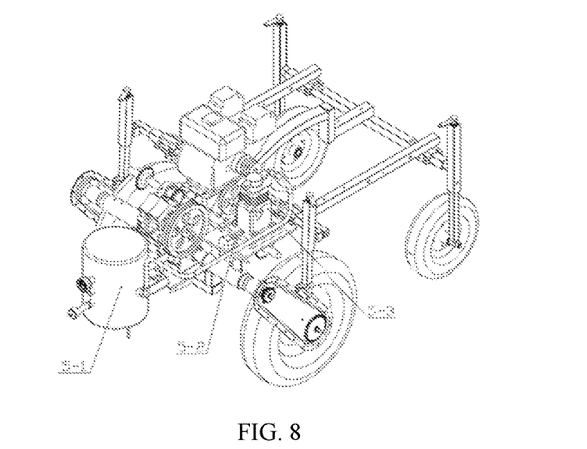
FIG. 8 is the structure diagram of power mechanism according to the present invention.
Figure 9:
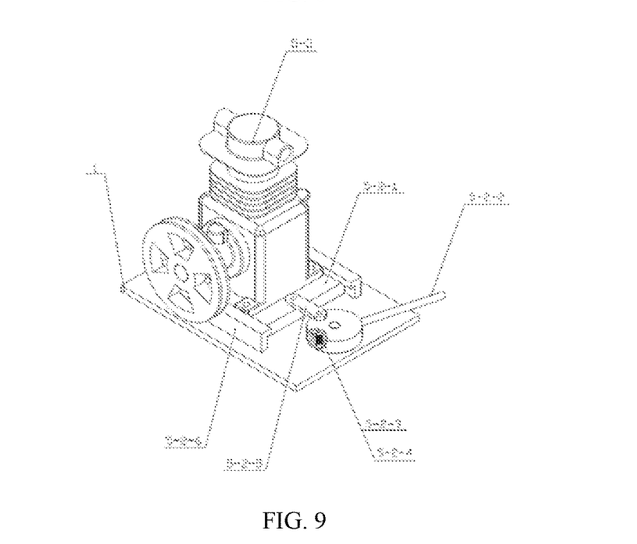
FIG. 9 is the structure diagram of clutch device according to the present invention.

As shown in FIG. 8, the power mechanism 5 also includes a gas storage tank 5-1, a clutch device 5-2, and an air compressor pump head 5-3; the air compressor is coupled to the power mechanism 5 for generating compressed gas; one end of the gas storage tank 5-1 is connected to the air compressor pump head 5-3, and the other end is connected to the gas source FRL 7-8;

As shown in FIG. 9, the clutch device 5-2 includes a pump head mount 5-2-1, a clutch handle 5-2-2, a positioning ball 5-2-3, a positioning spring 5-2-4, a connecting piece 5-2-5 and guiding strips 5-2-6; two guiding strips 5-2-6 are installed in parallel on the chassis bracket 1, the air compressor pump head 5-3 is installed on the pump head mount 5-2-1, the pump head mount 5-2-1 is located between the two guiding strips 5-2-6, and the pump head mount 5-2-1 can be moved along the guiding strips 5-2-6; the clutch handle 5-2-2 is rotatably installed on the chassis bracket 1, the bottom of the clutch handle 5-2-2 is provided with a first blind hole, the positioning ball 5-2-3 and the positioning spring 5-2-4 are placed in the first blind hole, and the positioning spring 5-2-4 is located above the positioning ball 5-2-3, one end of the connecting piece 5-2-5 is rotatably installed on the pump head mount 5-2-1, and the other end is rotatably installed on the clutch handle 5-2-2, the chassis bracket 1 is provided with a second blind hole and a third blind hole, the second blind hole, the third blind hole and the first blind hole are at the same distance from the center of the clutch handle 5-2-2. The positioning ball 5-2-3 is pressed under the force of the positioning spring 5-2-4 on the second blind hole, the air compressor pump head 5-3 stops working. The clutch handle 5-2-2 rotates around the first blind hole, the positioning ball 5-2-3 compresses the positioning spring 5-2-4 and rotates around the first blind hole along with the clutch handle 5-2-2. At the same time the connecting piece 5-2-5 drives the pump head mount 5-2-1 and the air compressor pump head 5-3 to move, achieving the tension of the belt drive. The positioning ball 5-2-3 is pressed under the force of the positioning spring 5-2-4 on the third blind hole, and the air compressor pump head 5-3 is started.

Figure 10:
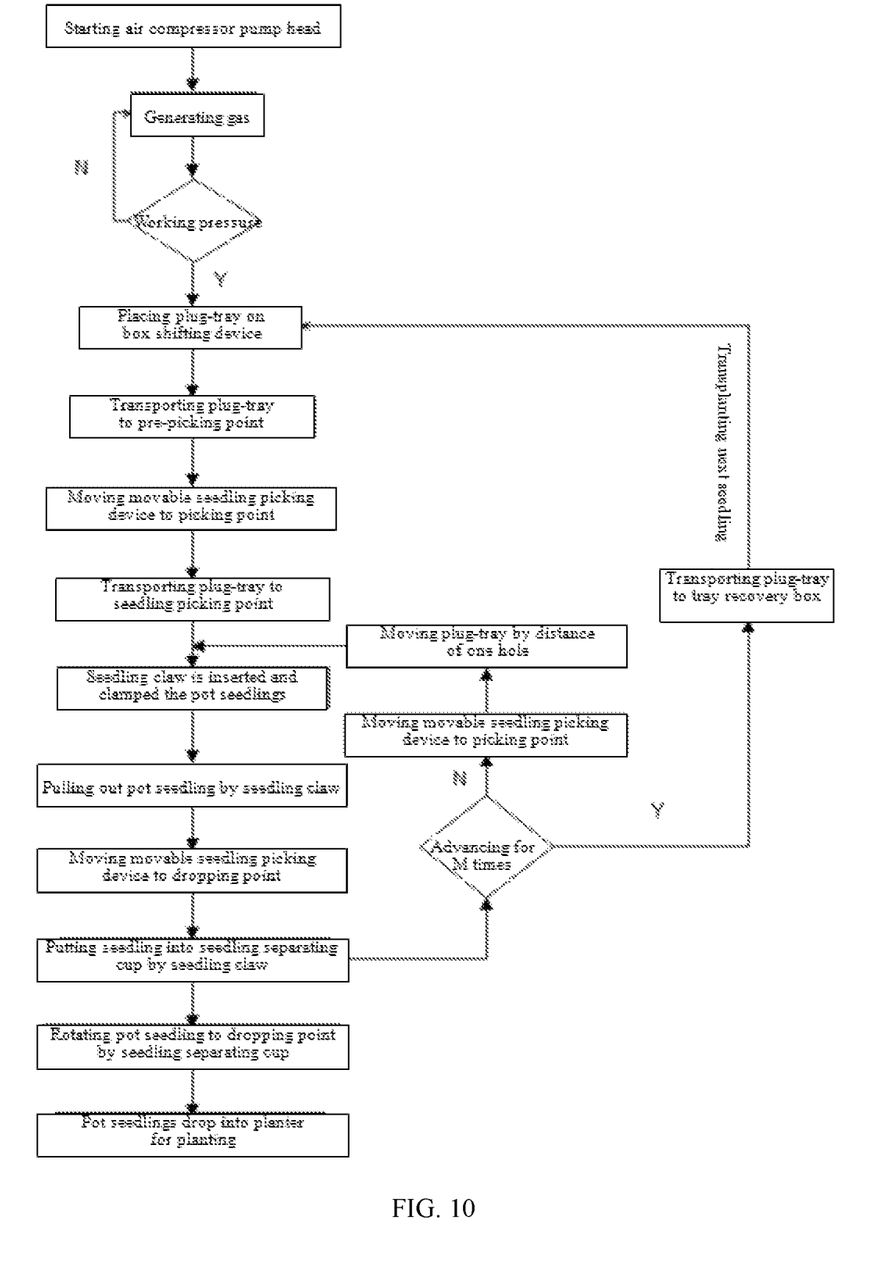
FIG. 10 is a work flow chart of the plug-tray seedling automatic transplanting machine according to the present invention.

As shown in FIG. 10, a control method of the plug-tray seedling automatic transplanting machine includes the following steps:

S0: The clutch handle 5-2-2 is rotated, so that the positioning ball 5-2-3 enters the third blind hole; at this time, the air compressor pump head 5-3 is connected to the power mechanism 5 and starts to deliver gas to the gas storage tank 5-1 by the power mechanism 5; the control system detects the pressure of the gas storage tank 5-1 to determine whether the air pressure reaches the desired working pressure, when the air pressure reaches the working air pressure required by the transplanting machine, the control system reaches the working condition.

Figure 11A:
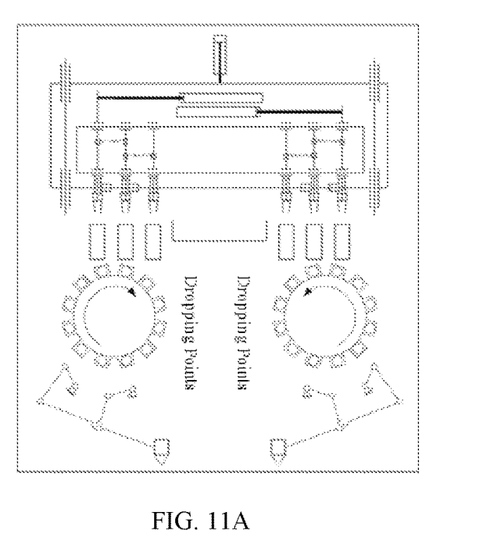
FIG. 11a is a diagram showing the initial state of the plug-tray seedling automatic transplanting machine according to the present invention.
Figure 11B:
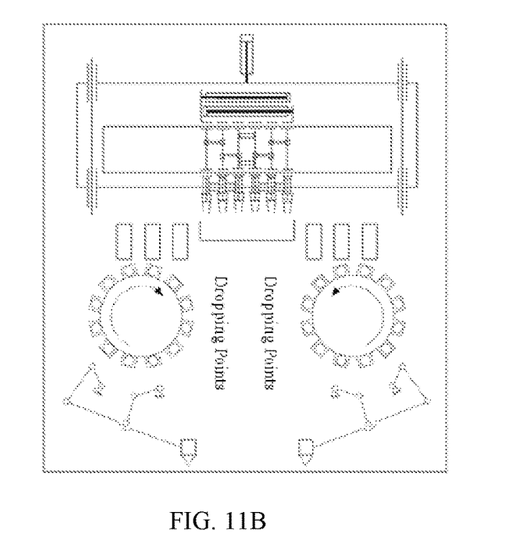
FIG. 11b is a state diagram showing the seedling picking mechanism moving to seedling picking point according to the present invention.
Figure 11C:
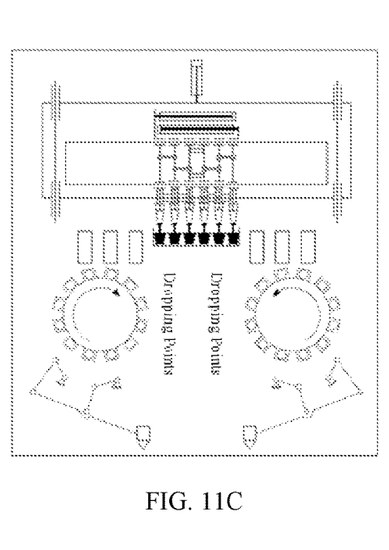
FIG. 11c is a state diagram showing the box shifting mechanism transporting the plug-tray to the seedling picking point according to the present invention.
Figure 11D:
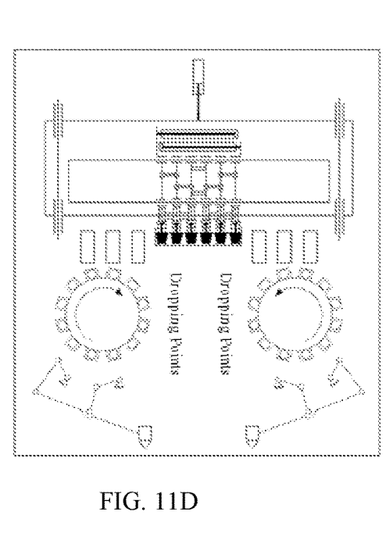
FIG. 11d is a state diagram showing the seedling claw device being inserted into pot seedlings according to the present invention.
Figure 11E:
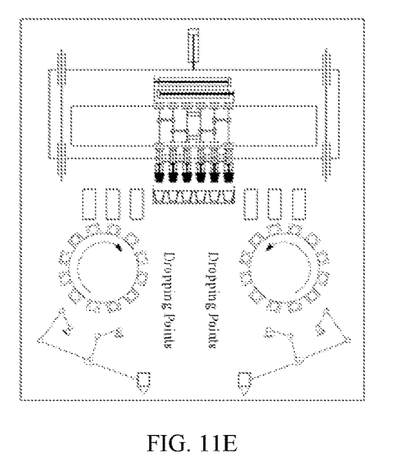
FIG. 11e is a state diagram showing seedling claw device being pulled out of the pot seedlings according to the present invention.
Figure 11F:
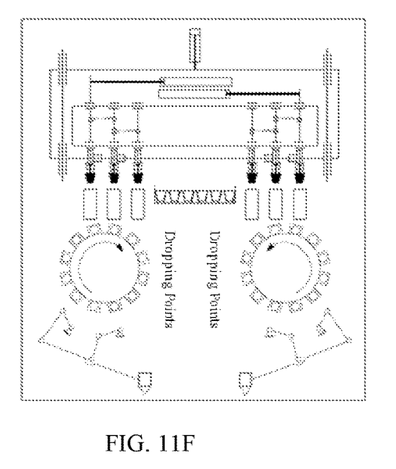
FIG. 11f is a state diagram showing the seedling picking mechanism taking seedlings to the seedling dropping point according to the present invention.
Figure 11G:
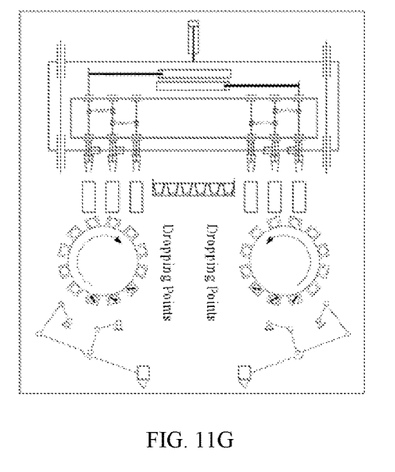
FIG. 11g is a state diagram showing the seedling claws dropping pot seedling into seedling separating mechanism according to the present invention.
Figure 11H:
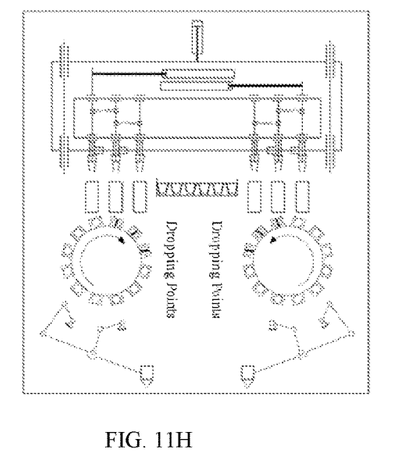
FIG. 11*h* is a state diagram showing seedling separating mechanism rotating the pot seedlings to seedling dropping opening according to the present invention.
Figure 11I:
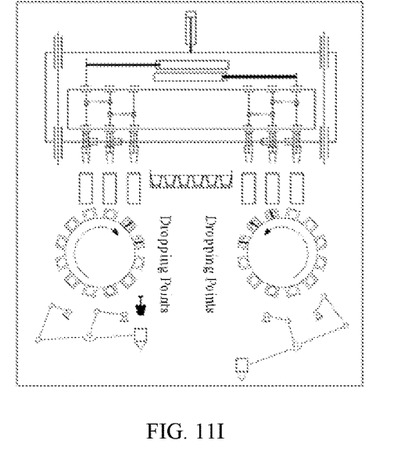
FIG. 11*i* is a state diagram showing the planting mechanism receiving seedlings according to the present invention.
Figure 11J:
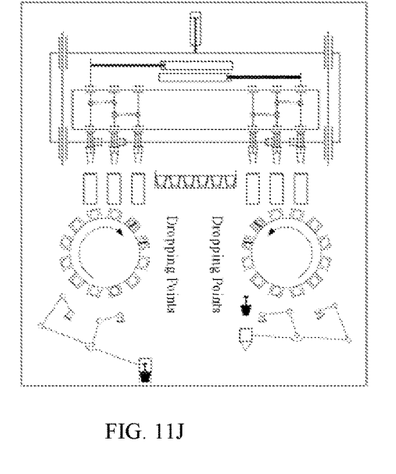
FIG. 11*j* is a schematic diagram showing the planting mechanism receiving seedlings and planting seedlings according to the present invention.

S1: As shown in FIG. 11a, the plug-tray 6-1 is placed on the conveying device 6-5 of the box shifting mechanism 6, at this time the seedling claws 7-3-3 of the two sets of seedling claw devices 7-3 are located above the seedling guiding device 4 and are concentric with the seedling guiding barrels; the control system starts the conveying device 6-5 to transport the plug-tray 6-1 to the pre-picking point and stops the movement of the conveying device 6-5 according to the signal output from the position proximity switch 6-2;

S2: as shown in FIG. 11b, the second actuator 7-10 is activated, and the control system controls the movement of the movable seedling claw device 7-3 to the picking point according to the signal output by the second travel switch group 7-12; each of the seedling claws 7-3-3 is located above the first row of holes of the plug-tray 6-1, and the center of the hole is concentric with each of the seedling claws;

S3: as shown in FIG. 11c, the control system activates the conveying device 6-5 to transport the plug-tray 6-1 to the picking point according to the signal output by the second travel switch group 7-12; as shown in FIG. 11d, the control system controls the first actuator 7-5 to insert the movable seedling claw device 7-3 into the pot seedling, and at the same time, according to the signal generated by the first travel switch group 7-11, the seedling claw 7-3-3 is controlled to clamp the pot seedling;

S4: as shown in FIG. 11e, the control system controls the first actuator 7-5 to drive the movable seedling claw device 7-3 to pull out the pot seedling; as shown in FIG. 11f, the control system controls the second actuator 7-10 to drive the movable seedling claw device 7-3 to move to the dropping point;

S5: as shown in FIG. 11g, assuming the plug-tray 6-1 has N holes in each row, and there are M rows in total, the control system controls the seedling separating mechanism 3 to rotate, when the seedling separating cups 3-1 trigger the travel switch 3-2 for N/2 times, according to the signals generated by the second travel switch group 7-12 and the travel switch 3-2, the control system controls the seedling claws 7-3-3 to open and drop the pot seedlings into the seedling guiding device 4, the pot seedlings enter the seedling separating mechanism 3 along the vertical seedling guiding barrels 4-5 and the inclined seedling guiding barrels 4-1, as shown in FIG. 11i and FIG. 11g, the seedling separating mechanism 3 rotates the pot seedlings and transports them to the seedling dropping point and then the seedlings drop into the planting mechanism 2, a seedling picking and dropping cycle ends;

S6: the control system controls the second actuator 7-10 to drive the movable seedling claw device 7-3 to move to the picking point; the control system controls the conveying device 6-5 to advance the plug-tray 6-1 by the distance of one hole for the next picking and dropping cycle, after repeating the above process for M times, the control system controls the conveying device 6-5 so that the plug-tray 6-1 moves forward and then drops to the plug-tray recovery device 6-3.

The invention claimed is:

1. A plug-tray seedling automatic transplanting machine, including a chassis bracket, a planting mechanism, seedling guiding devices, seedling separating mechanisms, and a power mechanism, the power mechanism is installed on the chassis bracket for powering the transplanting machine; characterized in that, the machine further includes a box shifting mechanism, a seedling picking mechanism and a control system, the box shifting mechanism is installed on the chassis bracket, the seedling picking mechanism is installed on the box shifting mechanism, and two sets of seedling separating mechanism are symmetrically arranged on both sides of the box shifting mechanism through the chassis bracket, the seedling guiding devices are provided above each set of the seedling separating mechanism, and the planting mechanism is provided under each set of the seedling separating mechanism; the control system controls the power mechanism, the planting mechanisms, the seedling separating mechanisms, the box shifting mechanism, and the seedling picking mechanism;

box shifting mechanism includes a plug-tray, a position proximity switch, a plug-tray recovery device, a box shifting bracket, and a conveying device, the conveying device is installed on the chassis bracket by the box shifting bracket; the plug-tray is placed on the conveying device, the conveying device is provided with the plug-tray recovery device at the end of the moving direction; the position proximity switch is installed on the box shifting bracket for judging whether the plug-tray has reached a pre-picking point, and transmitting the signal to the control system, the control system controls operation of the conveying device;

the seedling picking mechanism includes a first linear guiderail pair, a seedling picking bracket, movable seedling claw devices, second actuator limit blocks, a first actuator, a bottom plate, a second linear guiderail pair, a second actuator, a first travel switch group and a second travel switch group; the seedling picking bracket is fixed on the box shifting bracket, the first actuator is installed on the seedling picking bracket, a pull rod of the first actuator is connected to the bottom plate, and the bottom plate is connected to the seedling picking bracket through the first linear guiderail pair, the bottom plate is moved up and down by the first actuator; the bottom plate is connected to two movable seedling claw devices through the second linear guiderail pair, the second linear guiderail pair is arranged in a horizontal direction; each movable seedling claw device is connected to the second actuator, several second actuator limit blocks are provided on the bottom plate located near the seedling picking point and the seedling dropping point, the movable seedling claw device moves between the seedling picking point and the seedling dropping point by means of the second actuator and the second actuator limit block; the first travel switch group is installed near the first linear guiderail pair for judging whether the bottom plate reaches a predetermined position, and the second travel switch group is installed near the second linear guiderail pair for judging whether the movable seedling claw device reaches the predetermined position; the signals are transmitted to the control system respectively by the first travel switch group and the second travel switch group, the control system controls the movement of the first actuator, the second actuator, and the movable seedling claw device.

2. The plug-tray seedling automatic transplanting machine according to claim 1, characterized in that, the movable seedling claw device includes springs, seedling claw spacers, seedling claws, and screw rods, several seedling claws are installed on the bottom plate through the second linear guiderail pair; stop blocks are arranged on both sides of the screw rods, and two adjacent seedling claws are installed on the screw rod between the two stop blocks, the screw rod is covered with a spring, the spring is located between the two adjacent seedling claws; any one of the seedling claws at the two ends of the linearly-arranged seedling claws are connected to the second actuator; the seedling claws are provided with seedling claw spacers, when the second actuator moves, the seedling claw spacers make the distance between the adjacent seedling claws the same as the distance between the holes of the plug-tray, and the center of the seedling claw is coaxial with the center of the hole of the plug-tray.

3. The plug-tray seedling automatic transplanting machine according to claim 1, characterized in that, seedling separating cups are arranged in the seedling separating mechanisms in a circular shape, and a travel switch is installed on the seedling separating mechanism for detecting the number of turned separating cups.

4. The plug-tray seedling automatic transplanting machine according to claim 1, characterized in that, the seedling guiding device includes inclined seedling guiding barrels, a seedling guiding device bracket, inclined seedling guiding barrel clasps, vertical seedling guiding barrel clasps, and vertical seedling guiding barrels; the seedling guiding device bracket is installed on the seedling separating mechanism, the vertical seedling guiding barrel clasps and the inclined seedling guiding barrel clasps are respectively installed on the seedling guiding device bracket, the vertical seedling guiding barrels are installed in the vertical seedling guiding barrel clasps, the inclined seedling guiding barrels are installed in the inclined seedling guiding barrel clasps, and the seedling guiding outlets of the vertical seedling guiding barrels and the inclined seedling guiding barrels are in one-to-one correspondence with the seedling separating cups in the seedling separating mechanism.

5. The plug-tray seedling automatic transplanting machine according to claim 1, characterized in that, it further includes a gas source FRL and a pressure sensor, the first actuator and the second actuator are both double-acting cylinders; the gas source FRL is installed on the seedling picking bracket, one end of the gas source FRL is connected to gas source, and the other end is connected in parallel with the first actuator and the second actuator; solenoid valves are disposed on each of the first actuator and the second actuator.

6. The plug-tray seedling automatic transplanting machine according to claim 1, characterized in that, it also includes a gas storage tank, a clutch device, and an air compressor pump head; the air compressor is coupled to the power mechanism for generating compressed gas; one end of the gas storage tank is connected to the air compressor pump head, and the other end is connected to a gas source FRL;

the clutch device includes a pump head mount, a clutch handle, a positioning ball, a positioning spring, a connecting piece and guiding strips; two guiding strips are installed in parallel on the chassis bracket, the air compressor pump head is installed on the pump head mount, the pump head mount is located between the two guiding strips, and the pump head mount can be moved along the guiding strips; the clutch handle is rotatably installed on the chassis bracket, the bottom of the clutch handle is provided with a first blind hole, the positioning ball and the positioning spring are placed in the first blind hole, and the positioning spring is located above the positioning ball, one end of the connecting piece is rotatably installed on the pump head mount, and the other end is rotatably installed on the clutch handle, the chassis bracket is provided with a second blind hole and a third blind hole, the second blind hole, the third blind hole and the first blind hole are at the same distance from the center of the clutch handle.

7. A control method of the plug-tray seedling automatic transplanting machine according to claim 1, characterized in that, it includes the following steps:

S1: the plug-tray is placed on the conveying device of the box shifting mechanism, at this time the seedling claws of the two sets of seedling claw devices are located above the seedling guiding device and are concentric with the seedling guiding barrels; the control system starts the conveying device to transport the plug-tray to the pre-picking point and stops the movement of the conveying device according to the signal output from the position proximity switch;

the second actuator is activated, and the control system controls the movement of the movable seedling claw device to the picking point according to the signal output by the second travel switch group; each of the seedling claws is located above the first row of holes of the plug-tray, and the center of the hole is concentric with each of the seedling claws;

S3: the control system activates the conveying device to transport the plug-tray to the picking point according to the signal output by the second travel switch group; the control system controls the first actuator to insert the movable seedling claw device into the pot seedling, and at the same time, according to the signal generated by the first travel switch group, the seedling claw is controlled to clamp the pot seedling;

S4: the control system controls the first actuator to drive the movable seedling claw device to pull out the pot seedling; the control system controls the second actuator to drive the movable seedling claw device to move to the dropping point;

S5: assuming the plug-tray has N holes in each row, and there are M rows in total, the control system controls the seedling separating mechanism to rotate, when the seedling separating cups trigger the travel switch for N/2 times, according to the signals generated by the second travel switch group and the travel switch, the control system controls the seedling claws to open and drop the pot seedlings into the seedling guiding device, the pot seedlings enter the seedling separating mechanism along the vertical seedling guiding barrels and the inclined seedling guiding barrels, the seedling separating mechanism rotates the pot seedlings and transports them to the seedling dropping point and then the seedlings drop into the planting mechanism, a seedling picking and dropping cycle ends; and S6: the control system controls the second actuator to drive the movable seedling claw device to move to the picking point; the control system controls the conveying device to advance the plug-tray by the distance of one hole for the next picking and dropping cycle, after repeating the above process for M times, the control system controls the conveying device so that the plug-tray moves forward and then drops to the plug-tray recovery device.

8. The control method of the plug-tray seedling automatic transplanting machine according to claim 7, characterized in that, step S0 is provided before the step S1, and the step sS0 is: the clutch handle is rotated, so that the positioning ball enters the third blind hole; at this time, the air compressor pump head is started and starts to deliver gas to the gas storage tank by the power mechanism; the control system detects the pressure of the gas storage tank to determine whether the air pressure reaches the desired working pressure, when the air pressure reaches the working air pressure required by the transplanting machine, the control system reaches the working condition.

\* \* \* \* \*